United States Patent
Bansho et al.

(10) Patent No.: US 6,485,700 B1
(45) Date of Patent: *Nov. 26, 2002

(54) PROCESS FOR PRODUCING FREE HYDROXYLAMINE AQUEOUS SOLUTION

(75) Inventors: Kumiko Bansho, Shiga (JP); Yoshio Noguchi, Shiga (JP)

(73) Assignee: Toray Fine Chemicals Co., Ltd. (JP)

( * ) Notice: Subject to any disclaimer, the term of this patent is extended or adjusted under 35 U.S.C. 154(b) by 34 days.

This patent is subject to a terminal disclaimer.

(21) Appl. No.: 09/619,159

(22) Filed: Jul. 19, 2000

(30) Foreign Application Priority Data

Mar. 12, 2000 (JP) .......................................... 2000-68353

(51) Int. Cl.$^7$ .............................................. C01B 21/20
(52) U.S. Cl. ........................................ 423/387; 423/356
(58) Field of Search ................................ 423/387, 388, 423/356

(56) References Cited

U.S. PATENT DOCUMENTS

| | | | |
|---|---|---|---|
| 2,182,078 A | * 12/1939 | Fleming et al. | ............. 423/356 |
| 4,778,669 A | * 10/1988 | Fuchs et al. | ................ 423/387 |
| 5,837,107 A | * 11/1998 | Watzenberger et al. | ..... 423/387 |
| 6,299,734 B1 | * 10/2001 | Watzenberger et al. | ..... 423/387 |

* cited by examiner

*Primary Examiner*—Wayne A. Langel
(74) *Attorney, Agent, or Firm*—Schnader Harrison Segal & Lewis LLP

(57) ABSTRACT

This invention provides a process for producing a free hydroxylamine aqueous solution, by letting an alkali react with separated sulfates, for conversion into ammonia and sulfates not containing any nitrogen atom, recovering the valuable ammonia and recycling it in the reaction system for effective use.

This invention is a process for producing a free hydroxylamine aqueous solution, in which a free hydroxylamine aqueous solution is obtained by letting an aqueous solution or slurry containing hydroxylammonium sulfate and a gas mainly containing ammonia react with each other, mixing a solution mainly containing a lower alcohol with the produced aqueous solution or slurry, and separating the precipitated sulfates containing ammonium sulfate, comprising the steps of mixing an alkali with the separated sulfates, to produce ammonia gas, and recycling the ammonia in the reaction system.

15 Claims, 1 Drawing Sheet

PROCESS FOR PRODUCING FREE HYDROXYLAMINE AQUEOUS SOLUTION

BACKGROUND OF THE INVENTION

The present invention relates to a process for producing a free hydroxylamine aqueous solution, in more detail, a process for producing a free hydroxylamine aqueous solution, in which free hydroxylamine is obtained by the reaction between hydroxylammonium sulfate and ammonia, comprising the steps of mixing a lower alcohol to precipitate and separate the sulfates containing ammonium sulfate produced by the reaction; mixing an alkali with the separated ammonium sulfate, to produce ammonia, and recovering and recycling the produced ammonia.

PRIOR ART

Hydroxylamine is industrially widely used as a medical and agricultural intermediate raw material or as a metal surface treating agent, etc.

However, since free hydroxylamine is very unstable and is easily decomposed, it is generally converted into a relatively stable hydroxylamine salt (hydroxylammonium salt) for use. The decomposition of free hydroxylamine is especially likely to occur, for example, in the presence of heavy metal ions, at a high concentration, in a strong alkali or at a relatively high temperature.

When hydroxylamine is actually used in the above applications, free hydroxylamine, not a hydroxylammonium salt, is preferably used, and an aqueous solution containing free hydroxylamine at a higher concentration is often required. Such a free hydroxylamine aqueous solution has been obtained by several methods.

As a recent method for obtaining free hydroxylamine, the reaction between a hydroxylammonium salt and an alkali is used. For example, in the case of the reaction between hydroxylammonium sulfate and ammonia, after completion of reaction, the reaction system contains a large amount of ammonium sulfate in addition to the intended free hydroxylamine. So, it is proposed to separate free hydroxylamine from ammonium sulfate, for obtaining a highly pure and highly concentrated free hydroxylamine solution.

In the method described in U.S. Pat. No. 4,956,168, the ammonium sulfate precipitated in the reaction between hydroxylammonium sulfate and ammonia in an alcohol is removed, to obtain a free hydroxylamine alcohol solution. The alcohol solution is then mixed with an acid other than sulfuric acid, to synthesize a hydroxylammonium salt other than hydroxylammonium sulfate.

Furthermore, German Patent Publication No. 1247282 and German Patent Publication No. 3601803 (Japanese Patent Laid-Open (Kokai) No. Sho62-171905, U.S. Pat. No. 4,778,669) describe methods for obtaining a free hydroxylamine alcohol solution by letting hydroxylammonium and ammonia react with each other in an alcohol and removing the precipitated ammonium sulfate.

Furthermore, in German Patent Publication No. 19547758 (U.S. Pat. No. 5,837,107), hydroxylammonium sulfate and an alkali are caused to react with each other in water not containing any alcohol, and the precipitated salt is removed. Then, the reaction solution is supplied into an intermediate stage of a column, and separated into a hydroxylamine aqueous solution not containing any salt discharged from an upper stage and an aqueous solution containing a salt discharged from a lower stage.

In the conventional methods for obtaining free hydroxylamine by the reaction between hydroxylammonium sulfate and ammonia, it is mainly intended to separate the free hydroxylamine and ammonium sulfate produced by the reaction, but what will happen with the separated ammonium sulfate is not discussed.

Especially if the hydroxylammonium sulfate used for the reaction is obtained according to the Raschig's method, recently a purchased sodium nitrite aqueous solution is often used as a raw material, instead of ammonium nitrite. In this case, the sulfates obtained after completion of reaction contain not only ammonium sulfate but also the sodium sulfate contained in the raw material. When the sulfates are a mixture of them, it is very difficult to separate ammonium sulfate from sodium sulfate, and it is not appropriate to use the mixture as a valuable substance. If the sulfates are dissolved to be dumped as waste water, an environmental problem arises since ammonium sulfate contains nitrogen atoms.

OBJECTS OF THE INVENTION

As described above, if hydroxylammonium sulfate is treated by ammonia, a large amount of sulfates containing ammonium sulfate are produced. Hitherto, the sulfates are separated and removed beforehand, to simplify the subsequent operation of obtaining free hydroxylamine. When the ammonium sulfate in the separated sulfates is dumped as waste water, any treatment for environmental conservation is necessary since the waste water contains nitrogen atoms.

An object of the present invention is to provide a process for producing a free hydroxylamine aqueous solution, in which the sulfates separated like this are caused to react with an alkali, to be converted into ammonia and sulfates not containing any nitrogen atom, for recovering valuable ammonia from them, to recycle it in the reaction system for effective use.

Another object of the present invention is to provide a process for producing a free hydroxylamine aqueous solution, which can be effectively used when the sulfates obtained after completion of reaction are a mixture consisting of ammonium sulfate and sodium sulfate difficult to separate.

Other objects of this invention will be clarified in the following description.

BRIEF DESCRIPTION OF THE INVENTION

This invention which achieves the above objects is a process for producing a free hydroxylamine aqueous solution, in which a free hydroxylamine aqueous solution is obtained by letting an aqueous solution or slurry containing hydroxylammonium sulfate and a gas mainly containing ammonia react with each other, mixing a solution mainly containing a lower alcohol with the produced aqueous solution or slurry, and separating the precipitated sulfates containing ammonium sulfate, comprising the steps of mixing an alkali with the separated sulfates, to produce ammonia gas containing water, and recycling the ammonia in the reaction system.

This invention also includes the following effective modes.

(a) As the aqueous solution or slurry containing hydroxylammonium sulfate, some or all of the hydroxylammonium sulfate containing sodium sulfate obtained according to the Raschig's method is used.

(b) The alkali is sodium hydroxide or calcium oxide and/or calcium hydroxide.

(c) As sodium hydroxide, a sodium hydroxide aqueous solution is used.

(d) As the calcium oxide and/or calcium hydroxide, a calcium hydroxide slurry is used.

(e) The sulfates containing ammonium sulfate are formed into an aqueous solution, and an alkali is mixed with it.

(f) A solution mainly containing a lower alcohol is mixed with the reaction solution remaining after separating and removing the sulfates containing ammonium sulfate precipitated in the ammonia reaction.

(g) The sulfates obtained by separation and an alkali are mixed, to produce ammonia which is recovered and recycled in the reaction system.

(h) Powdery hydroxylammonium sulfate is added to the reaction solution remaining after separating and removing the sulfates containing ammonium sulfate precipitated in the ammonia reaction, and ammonia is again caused to react.

(i) The operation of the above (h) is repeated plural times.

(j) The reaction solution obtained in any of the above (f) to (i) and a solution mainly containing a lower alcohol are mixed.

(k) The lower alcohol is methanol.

(l) The reaction between hydroxylamine sulfate and ammonia is effected in the presence of a hydroxylamine stabilizer.

(m) The mixing of the sulfates and the alkali is effected at room temperature or higher temperature.

(n) Nitrogen gas or air is blown into the mixed solution consisting of the sulfates and the alkali, and the ammonia produced by the reaction is obtained by degasification.

DETAILED DESCRIPTION OF THE INVENTION

Figure 1:
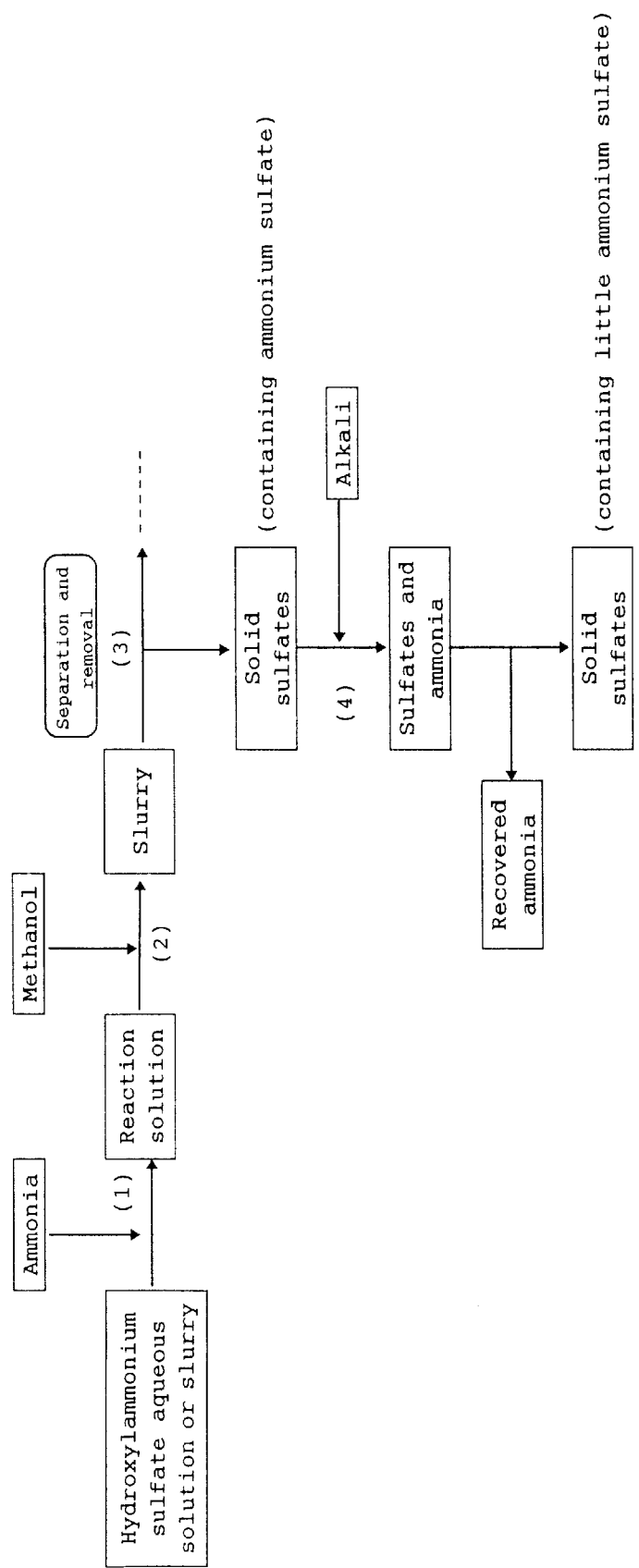
FIG. 1 is a model diagram for illustrating the general operation in the process for producing a free hydroxylamine aqueous solution of this invention.

In this invention, at first, hydroxylammonium sulfate and ammonia are caused to react with each other. The ammonium sulfate produced in the reaction between hydroxylammonium sulfate and ammonia can be mostly precipitated by mixing a required amount of a lower alcohol such as methanol in the reaction system, and separated as solid ammonium sulfate.

To make the ammonium sulfate obtained as a slurry industrially valuable, the ammonium sulfate obtained by solid-liquid separation must be dried inconveniently, and this is not industrially advantageous. If the ammonium sulfate slurry is dumped as it is, the nitrogen content in the waste water poses an environmentally unacceptable problem. This invention provides a method in which valuable ammonia is produced from ammonium sulfate inconvenient as a byproduct and recovered to be recycled in the reaction system. The sulfate such as sodium sulfate byproduced when ammonia is produced can be dumped as it is as waste water since it does not contain nitrogen, or can be industrially used as it is as an aqueous solution.

Furthermore in the recovery of a valuable material from a byproduct for recycling, if all the recovered valuable material is used for recycling, usually problems arise in quality, industrial operation and accumulation of impurities in the system. However, surprisingly, the inventors found that even if almost all the amount of recovered ammonia is recycled, the reaction takes place smoothly and that highly pure free hydroxylamine can be obtained. The recycling of ammonia is desirable also in view of resource saving and this invention dramatically improve the process economy.

The basic process for producing a free hydroxylamine aqueous solution of this invention consists of the following steps (1) to (5). FIG. 1 is a model diagram for illustrating the general operation in the process for producing a free hydroxylamine aqueous solution of this invention, and the numbers (1) to (5) in the drawing correspond to the following step Nos. (1) to (5).

(1) An aqueous solution or slurry containing hydroxylammonium sulfate and a gas mainly containing ammonia are caused to react with each other.

(2) A solution mainly containing a lower alcohol such as methanol is mixed with the obtained reaction solution, to precipitate solid sulfates containing ammonium sulfate.

(3) The precipitated solid sulfates containing ammonium sulfate are separated.

(4) The solid sulfates and an alkali are mixed, to produce ammonia gas containing water and sulfates little containing ammonium sulfate.

(5) The produced ammonia is recovered and recycled in the reaction system with hydroxylammonium sulfate.

This invention relates to a process for synthesizing a free hydroxylamine aqueous solution. For efficient and safe synthesis, it is preferable to observe the following conditions.

As the hydroxylammonium sulfate aqueous solution or slurry suitably used in this invention, for example, that obtained according to the Raschig's method is suitable, but it may also partially contain a solution with powdery hydroxylammonium sulfate dissolved in water. Furthermore, only a solution with powdery hydroxylammonium sulfate dissolved in water can also be used. Moreover, a lower alcohol such as methanol can also be mixed with it to some extent, or free hydroxylamine or an inorganic substance such as sodium sulfate or ammonium sulfate may also be contained in it to some extent.

The Raschig's method referred to here is a method for synthesizing hydroxylammonium sulfate according to the following reaction. Sulfur is burned to produce sulfurous acid gas, and sodium nitrite and the sulfurous acid gas are caused to react with each other in the presence of sodium hydroxide, to produce sodium hydroxylaminedisulfonate, and it is hydrolyzed to obtain hydroxylammonium sulfate and sodium sulfate. The two sulfates obtained according to this method are usually separated using the difference in solubility in water, and it can happen that even refined hydroxylammonium sulfate contains sodium sulfate (corresponding to the solubility at the water temperature during refining).

Since the reaction between hydroxylammonium and ammonia in this invention is exothermic, temperature control is important for safety and disaster prevention. Specifically it is preferable that the temperature of the reaction between hydroxylammonium sulfate and ammonia in water is 60° C. or lower. More preferable is 40° C. or lower. A practical and suitable temperature range is about 20 to 40° C.

To prevent the decomposition of produced free hydroxylamine, it is desirable to add a hydroxylamine stabilizer beforehand to the hydroxylammonium sulfate aqueous solution or slurry.

The hydroxylamine stabilizer can be 8-aminoquinoline or 8-hydroxyquinoline, and especially 8-aminoquinoline can be preferably used. As for the amount of the stabilizer added, 50 ppm or less based on the amount of free hydroxylamine is effective. A preferable range is 5 to 20 ppm.

If sulfates mainly containing ammonium sulfate are precipitated in the ammonia reaction, it is preferable that the solution mainly containing a lower alcohol to be mixed for precipitating the sulfates is mixed with the aqueous solution remaining after separating and removing the sulfates, but it can also be mixed with the slurry containing the sulfates.

It is preferable that the lower alcohol used here is an aliphatic alcohol with 1 to 3 carbon atoms, and especially methanol is suitable.

In this invention, after hydroxylammonium sulfate and ammonia are caused to react with each other efficiently in an aqueous solution, a lower alcohol is mixed with the reaction system. In this case, a large amount of sulfates containing ammonium sulfate are produced, and some of them can be precipitated as solid sulfates and separated and removed.

Furthermore, in this invention, after powdery hydroxylammonium sulfate is added to the aqueous solution obtained by separating and removing the sulfates as described above, ammonia can be added again for reaction, to precipitate sulfates which can be separated and removed again, and a solution mainly containing a lower alcohol can be mixed, to enhance the free hydroxylamine concentration in the aqueous solution. This operation can be effected once, but can also be repeated several times, for example, 2 to 4 times.

In this invention, as described above, the separation and removal of precipitated sulfates, and the addition of powdery hydroxylammonium sulfate for subsequent reaction with ammonia as described above can be repeated to further enhance the free hydroxylamine concentration in the system, and then a solution mainly containing a lower alcohol can be mixed to enhance the efficiency.

The alkali used to react with the sulfates containing ammonium sulfate can be any alkali which allows the sulfates newly produced by this reaction to be effectively used. However, sodium hydroxide or calcium oxide and/or calcium hydroxide, etc. less expensive than ammonia is preferable.

The advantage of using sodium hydroxide as the alkali can be manifested when the hydroxylammonium sulfate obtained according to the Raschig's method contains sodium sulfate. It is difficult to industrially use a mixture consisting of ammonium sulfate and sodium sulfate, and it is preferable to mix sodium hydroxide, for producing ammonia and converting all the salts into sodium sulfate. Furthermore, when the alkali is sodium hydroxide, the solubility of the produced sodium sulfate is relatively high in solubility in water and is less likely to be precipitated, to allow easy continuous operation. These sulfates, especially sodium sulfate is generally used as 33% aqueous solution, but the concentration of sodium sulfate aqueous solution is not limited. As required, refining by such as recrystallization from a solution can be effected for making a solid product.

If calcium oxide and/or calcium hydroxide is used as the alkali, gypsum is byproduced, and it can be effectively used in the cement industry, etc.

Since the reaction between a sulfate and an alkali is exothermic, it is desirable to use the alkali as an aqueous solution or slurry for reaction under milder conditions. The amount of the alkali must be not less than an equivalent for each equivalent of the sulfates estimated to be produced by the reaction, for liberating ammonia.

One of preferable methods for efficiently producing the ammonia gas containing water by the reaction for recovery by degasification is to blow nitrogen gas or air into the reaction system.

In this invention, when the sulfates containing ammonium sulfate and an alkali are caused to react with each other, the use of the sulfates as an aqueous solution for reaction with the alkali allows the reaction to take place smoothly, and ammonia can be produced efficiently. The reaction between the sulfates and the alkali can take place even at room temperature, but a temperature higher than room temperature is preferable for allowing the reaction to take place more quickly and for allowing produced ammonia to be released efficiently from the aqueous solution. An especially preferable reaction temperature is the boiling point of the aqueous solution.

The free hydroxylamine aqueous solution finally obtained in the production process of this invention contains 1 ppm or less of Fe and 50 ppm or less of $SO_4^{2-}$ as impurities, showing a high quality. Furthermore, for example by controlling the product distilling-out rate, the Fe content can be kept at 10 ppb or less, and this product can be suitably used as a material for electronics. It is especially significant to use a highly pure low Fe content product obtained by this invention, as one ingredient of the resist removing liquids for semiconductors and LCD. That is, in the electronics material industry, there has been a long-time unfilled demand for a highly pure free hydroxylamine aqueous solution low in metal content, and the process of this invention allows it to be supplied industrially at low cost.

EXAMPLES

This invention is described below more particularly in reference to examples, but is not limited thereto or thereby.

EXAMPLES 1

A 2-liter four-neck flask with a gas blow-in port, thermometer, pH meter and stirrer was charged with a hydroxylammonium sulfate aqueous solution consisting of 234.5 g of hydroxylammonium sulfate obtained according to the Raschig's method, 58.5 g of sodium sulfate and 234.5 g of water, and 8-hydroxyquinoline was added as a chelate producing stabilizer by about 0.0006 mole for each mole of hydroxylammonium sulfate. With stirring, at 20 to 25° C., ammonia gas was supplied till a pH of 9.2 was reached, and 234.5 g of powdery hydroxylammonium sulfate was supplied. Again at 20 to 25° C., ammonia gas was supplied till a pH of 9.2 was reached. To the reaction mixture formed like a slurry because of the precipitated solid sulfates, 545 g of methanol was added dropwise at 20 to 25° C., taking 1.5 hours, to precipitate most of the sulfates, and the slurry was filtered. The separated cake was washed by 200 g of methanol. The filtrate joined with the washing contained 184.6 g of free hydroxylamine. On the other hand, 446 g of the washed cake had 0.4 g of free hydroxylamine deposited. So, though 189.8 g of hydroxylamine was contained in the raw material used, 185.0 g of free hydroxylamine in total was produced. The above liberation reaction flask was charged with the same hydroxylammonium sulfate aqueous solution composed as described above and 8-hydroxyquinoline by the same amounts and kept to stand by. Separately, a 2-liter four-neck flask with a reflux condenser, thermometer, dropping funnel and stirrer was charged with all the separated sulfate cake and 447 g of water, and heated to 70° C. with stirring. In succession, 501 g of 48% sodium hydroxide aqueous solution corresponding to 2.2 molar times the ammonium sulfate content in the sulfate cake was added dropwise through the dropping funnel with the temperature kept at 70 to 80° C. The ammonia gas produced by the decomposition of ammonium sulfate was supplied through the top of the reflux condenser into the gas blow-in port of the liberation reaction flask charged with the hydroxylammonium sulfate aqueous solution, till a pH of 9.2 was reached at 20 to 25° C. When the predetermined pH was reached, the dropwise addition of the sodium hydroxide aqueous solution was suspended, and 234.5 g of powdery hydroxylammonium sulfate was supplied into the liberation reaction flask, and the dropwise addition of the sodium hydroxide aqueous solution was restarted, to supply the produced ammonia gas. After all the amount of the sodium hydroxide aqueous solution was added dropwise, the dropping funnel was used as a gas blow-in port for blowing nitrogen gas into the solution at a flow rate of 30 ml/min for 30 minutes with the temperature kept at 70 to 80° C., to supply the remaining ammonia gas into the liberation reaction flask. At this time, since the pH of the liberation reaction solution was 7.8, newly produced ammonia gas was supplied till a pH of 9.2 was reached, to complete the reaction. The rate of the amount of the ammonia recovered by the alkali decomposition of ammonium sulfate in the separated sulfates, to the amount of ammonia required for liberating the hydroxylammonium sulfate used as a raw material was 96.5%. To the reaction mixture, 545 g of methanol was added dropwise at 20 to 25° C., taking 1.5 hours. During the dropwise addition, the dissolved sulfates were precipitated, but the stirring property was not especially worsened as in the case of liberation by newly produced ammonia gas only, to allow the dropwise addition of methanol to be completed. Then, the slurry was filtered, and the separated cake was washed by 200 g of methanol. The filtrate joined with the washing contained 183.8 g of free hydroxylamine. Since the washed cake had 0.8 g of free hydroxylamine deposited, 184.6 g of free hydroxylamine in total was produced, and the reaction result was equivalent to that achieved when liberation was effected by using newly produced ammonia gas only.

In this example, a slurry was handled, but clogging and any other operation problem did not happen. Furthermore, the quality of the free hydroxylamine aqueous solution obtained when newly produced ammonia gas only was used was equivalent to that obtained when the ammonia generated from ammonium sulfate was used.

Effects of the Invention

In the reaction between hydroxylammonium sulfate and ammonia as a general method for obtaining free hydroxylamine, the operation for separating and removing some of the sulfates containing ammonium sulfate produced in a large amount in the reaction, from the reaction system as solid sulfates, and the method for treating the sulfates are important.

According to this invention, after hydroxylammonium sulfate and ammonia are caused to react with each other efficiently in an aqueous solution, a lower alcohol is mixed in the reaction system, to produce salts which can be mostly precipitated to be separated and removed. This simplifies the subsequent operation of obtaining free hydroxylamine, and enhances the purity of the free hydroxylamine aqueous solution as a product advantageously. Furthermore, in this invention, an alkali is caused to react with the separated sulfates containing ammonium sulfate, to produce ammonia gas and sulfates not containing any nitrogen, and the ammonia gas is recycled in the reaction while the sulfates can be effectively used as a product as the case may be.

As described above, in this invention, an alkali is mixed with separated ammonium sulfate, to recover valuable ammonia, and it can be recycled in the reaction system for effective use.

What is claimed is:

1. A process for producing a free hydroxylamine aqueous solution, in which a free hydroxylamine aqueous solution is obtained by reacting an aqueous solution or slurry containing hydroxylammonium sulfate with a gas containing ammonia, mixing a solution containing a lower alcohol with the produced reaction solution, and separating the precipitated sulfates containing ammonium sulfate, said process further comprising the steps of mixing an alkali with the separated sulfates, to produce ammonia gas, and recycling the ammonia in the reaction system.

2. A process for producing a free hydroxylamine aqueous solution, according to claim 1, wherein part or all of the hydroxylammonium sulfate containing sodium sulfate is used as the aqueous solution or slurry containing hydroxylammonium sulfate.

3. A process for producing a free hydroxylamine aqueous solution, according to claim 1 or 2, wherein the alkali is sodium hydroxide or calcium oxide and/or calcium hydroxide.

4. A process for producing a free hydroxylamine aqueous solution, according to claim 3, wherein a sodium hydroxide aqueous solution is used as the sodium hydroxide.

5. A process for producing a free hydroxylamine aqueous solution, according to claim 3, wherein a calcium hydroxide slurry is used as the calcium oxide and/or calcium hydroxide.

6. A process for producing a free hydroxylamine aqueous solution, according to claim 1, wherein a solution containing ammonium sulfate are formed into an aqueous solution which is mixed with the alkali.

7. A process for producing a free hydroxylamine aqueous solution, according to claim 1, wherein a solution containing a lower alcohol is mixed with the reaction solution remaining after separating and removing the sulfates containing ammonium sulfate precipitated in the ammonia reaction.

8. A process for producing a free hydroxylamine aqueous solution, according to claim 7, wherein the sulfates obtained by separation and the alkali are mixed to produce ammonia which is recovered and recycled in the reaction system.

9. A process for producing a free hydroxylamine aqueous solution, according to claim 1, wherein powdery hydroxylammonium sulfate is added to the reaction solution remaining after separating and removing the sulfates containing ammonium sulfate precipitated in the ammonia reaction, and then again reacting with ammonia.

10. A process for producing a free hydroxylamine aqueous solution, according to claim 1, characterized by repeatedly adding hydroxylammonium sulfate to the solution remaining after separating and removing the sulfates containing ammonium sulfate precipitated in the ammonia reaction and reacting with ammonia.

11. A process for producing a free hydroxylamine aqueous solution, according to claim 1, wherein the reaction solution obtained and a solution containing a lower alcohol are mixed.

12. A process for producing a free hydroxylamine aqueous solution, according to claim 1, wherein the lower alcohol is methanol.

13. A process for producing a free hydroxylamine aqueous solution, according to claim 1, wherein the reaction between hydroxylammonium sulfate and ammonia is effected in the presence of a hydroxylamine stabilizer.

14. A process for producing a free hydroxylamine aqueous solution, according to claim 1, wherein the mixing of the sulfates and the alkali is effected at room temperature or higher temperature.

15. A process for producing a free hydroxylamine aqueous solution, according to claim 1, wherein nitrogen gas or air is blown into the mixed solution consisting of the sulfates and the alkali, and the ammonia produced by the reaction is obtained by degasification.

* * * * *